United States Patent Office 2,767,142
Patented Oct. 16, 1956

2,767,142

LUBRICATING COMPOSITIONS

Rupert C. Morris, Berkeley, John L. Van Winkle, San Lorenzo, and Paul H. Williams, Berkeley, Calif., assignors to Shell Development Company, Emeryville, Calif., a corporation of Delaware No Drawing. Application June 29, 1953,
Serial No. 364,916

17 Claims. (Cl. 252—32.5)

This invention relates to a novel class of compounds adapted to improve bases such as lubricants, greases, fuels, resins, corrosion inhibiting compositions, emulsions, aqueous solutions, etc. More particularly this invention pertains to lubricants and fuels having incorporated therein a novel multifunctional additive possessing extreme pressure, anti-wear and detergent properties as well as acting as an inhibitor of oxidation and corrosion.

It is known that certain classes of compounds can improve base lubricants in certain specific properties. Thus, soaps or organic salts generally are regarded as being capable of imparting detergency to base lubricants, whereas compounds containing chlorine, sulfur, phosphorus or lead are capable of imparting extreme pressure characteristics to lubricants. The combination of additives wherein each additive exerts its influence without interfering with the function of other additives is rather difficult to attain. In most cases, interference or co-reaction occurs negating the desirable properties of the additives involved.

It is an object of this invention to improve organic materials such as lubricants, fuels and other types of compositions by addition thereto of a novel multifunctional additive. Another object of this invention is to produce an improved lubricant and fuel of outstanding stability and extreme pressure properties. Another object of this invention is to prevent oxidation of the base lubricant and corrosion and wear of surfaces contacted by said lubricant. Other objects of this invention will be apparent from the following description of this invention.

It has now been discovered that the foregoing and related ends can be accomplished by addition to base lubricants a minor amount of from about 0.01 to 10% and preferably from about 0.1 to 5% by weight of an organic phosphorus compound having the general formula:

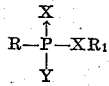

wherein X is a chalcogen element and preferably being oxygen and/or sulfur; Y is a middle halogen, i. e., bromine and/or chlorine; $R_1$ can be hydrogen or an organic radical such as an alkyl, aryl, alkaryl, aralkyl, cyclic radical and polar-substituted derivative thereof or a cationic radical which can be inorganic or organic such as Na, Li, Ca, Ba, Zn, ammonium, amines, quaternary ammonium compounds, etc.; and R is a hydrocarbyl radical containing at least one and preferably more than one halogen atom, preferably not more than four carbon atoms removed from the phosphorus atom, said radical R being directly linked to the phosphorus atom through a carbon atom.

Additives for use in compositions of this invention can be prepared by hydrolyzing the complexes described in the co-pending application, Serial No. 342,974, filed March 17, 1953. Specifically, the complex can be prepared by reacting organo halides, preferably organo middle halides with phosphorus trihalides such as phosphorus trichloride or phosphorus tribromide in the presence of a Friedel-Crafts type catalyst such as aluminum chloride. The hydrolysis product can be converted into esters, partial acids, salts, etc., and used as additives in compositions of this invention.

The halogen-containing compounds suitable for use in forming compounds of this invention include carbon tetrachloride, carbon tetrabromide, chloroform, ethylene chloride, bromoform, methyl chloroform, hexachloroethane, hexachlorocyclohexane, hexachlorocyclopentadiene, bromotrichloromethane, phenyltrichloromethane, ethylene dichloride, tribromochloromethane, 1,2,3,4,5-pentachloro - 5 - (1,2,2,2,-tetrachloroethyl)cyclopentadiene, 1,2,3,4,6-pentachloro-6-trichloromethyl fulvene and mixtures thereof.

The trivalent phosphorus compounds used in forming products of this invention include: $PCl_3$, $PBr_3$, $PBrCl_2$, $C_2H_5PCl_2$, $C_2H_5OPCl_2$, $C_3H_5OPCl_2$ and the like.

The ingredients used to form products of this invention, namely, organohalides, phosphorus trihalides and Friedel-Crafts compound ($AlCl_3$), can be varied over wide proportions but generally are used in stoichiometric amounts. Preferred proportions in moles of the ingredients in the order mentioned above can be 19.5:2.5:(1.25–3.5 and preferably 2.5). The reaction is generally carried out at temperatures ranging from about 0° to about 100° C. and preferably between 40 and 60° C.

The following examples illustrate methods of preparing products of this invention:

EXAMPLE I.—TRICHLOROMETHANECHLOROPHOSPHONIC ACID

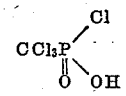

A. This product was prepared by first forming trichloromethylphosphonium tetrachloride-$AlCl_3$ complex

which is formed by reacting in a flask equipped with a stirrer about 333 gms. of aluminum chloride and 3,000 gms. of carbon tetrachloride. The mixture was warmed to about 40° C. and 343 gms. of phosphorus trichloride added dropwise into the mixture and the temperature maintained at 40–45° C. for about 2 hours, and thereafter the product was filtered. The product was topped at 100° C. under house vacuum to remove any residual carbon tetrachloride and about 96% yield of trichloromethylphosphonium tetrachloride-$AlCl_3$ complex was obtained. This complex was purified by recrystallization from methylene chloride to give needlelike crystals melting at 100° C.

B. Preparation of trichloromethanephosphonic dichloride

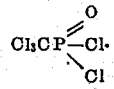

Into a flask containing a mixture of 710 gms. ice, 237 gms. concentrated HCl and 1,060 gms. of methylene chloride maintained at a temperature of −5° C. was rapidly added while stirring 300 gms. of trichloromethylphosphonium tetrachloride-AlCl₃ complex (A) and the reaction temperature was maintained at 0 to −5° C. Total hydrolysis time was about 30 minutes. The aqueous phase was separated and the methylene chloride was flashed off. About 167 gms. of trichloromethanephosphonic dichloride was recovered which was purified by subliming under reduced pressure to give colorless needles melting at 112–113° C.

C. Preparation of trichloromethanechlorophosphonic acid

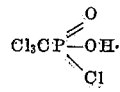

Into a flask containing about 250 gms. of water warmed to 40° C. was added about 100 gms. of trichloromethanephosphonic dichloride (B) and the temperature was allowed to remain at about 40° C. The mixture was stirred and on completion of the reaction water and HCl were flashed off. About 92 gms. of a white crystalline solid (M. P. 73° C.) which was purified by recrystallizing from benzene, was the final product trichloromethanechlorophosphonic acid.

EXAMPLE II.—PREPARATION OF 1,1-DICHLOROETHANEPHOSPHONIC ACID

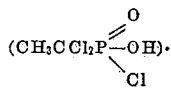

This product was prepared in accordance with the general procedure described in Example I (A, B and C) for the preparation of trichloromethanechlorophosphonic acid, except that instead of using carbon tetrachloride (Example I—A), methyl chloroform was used.

EXAMPLE III.—PREPARATION OF BUTYL TRICHLOROMETHANECHLOROPHOSPHONATE

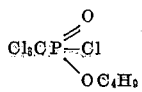

Into a suitable flask containing about 500 cc. of benzene was added about 1 mole of trichloromethanephosphonic acid dichloride (Example I—B) and the mixture cooled to 0° C. A solution of 1 mole of n-butanol in 1 mole of triethylamine and 100 cc. of benzene was slowly added and the temperature maintained at 0° to 3° C. and thereafter warmed to 40° C. The product was then filtered, washed with water and the water thereafter distilled off. About 0.803 mole of butyl trichloromethanechlorophosphonate, a water-white liquid boiling at 85° C. at 0.6 mm. was recovered.

EXAMPLE IV.—SODIUM TRICHLOROMETHANECHLOROPHOSPHONATE

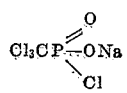

To about 0.5 mole of trichloromethanechlorophosphonic acid (Example I—C) in 200 cc. of water was added about 0.5 mole of 1.140 N sodium hydroxide. The water solution was concentrated to dryness to yield 0.5 mole of sodium trichloromethanechlorophosphonate, a white solid.

EXAMPLE V.—DI-N-BUTYLAMINE SALT OF TRICHLOROMETHANECHLOROPHOSPHONIC ACID

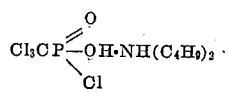

About 1 mole of trichloromethanechlorophosphonic acid (Example I—C) in water was treated with about 1 mole of di-n-butylamine. The reaction was exothermic and a white crystalline salt formed which was removed and dried, the salt of di-n-butylamine salt of trichloromethanechlorophosphonic acid having a melting point of 136–137° C.

EXAMPLE VI.—TRIBROMOMETHANECHLOROPHOSPHONIC ACID

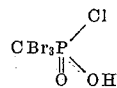

This product was prepared under the conditions as described in Example I except that instead of using carbon tetrachloride as one of the reactants, tribromochloromethane was used. The purified product had a melt point of 111–113° C.

EXAMPLE VII.—TRICHLOROMETHANEBROMOPHOSPHONIC ACID

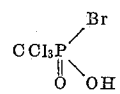

This product was prepared in substantially the same manner as described in Example I except that instead of using phosphorus trichloride as one of the ingredients, phosphorus tribromide was used. The product had a melt point of 88–89° C.

Other examples of halophosphono compounds of this invention include:

Na, Li, Ca, Ba, Zn, Co, Fe, Al, di-2-ethylhexylamine, cyclohexylamine, morpholine, triethanolamine, benzylamine salts of trichloromethanechlorophosphonic acid, tribromomethanechlorophosphonic acid, 1,1-dichloroethanechlorophosphonic acid, 1,1-dichlorooctanechlorophosphonic acid, hexachlorocyclopentanechlorophosphonic acid, 1,1-dichlorobenzylchlorophosphonic acid, hexachlorocyclohexanechlorophosphonic acid, trichloromethanechlorothionophosphonic acid, tribromomethanebromothionophosphonic acid, S-trichloromethanechlorothiophosphonic acid, S-1,1-dichloroethanechlorothionophosphonic acid; isopropyl trichloromethanechlorophosphonate, 2 - ethylhexyltrichloromethanechlorophosphonate, phenyltrichloromethanechlorophosphonate, cyclohexyltrichloromethanechlorophosphonate, S-butyltrichloromethane chlorothiophosphonate, butyl 1,1-dichloromethanechlorophosphonate, 2-ethylhexyltribromomethanebromophosphonate. The free acid of the above-identified salts and esters can be used as oil additives as well as mixtures of said free acids, esters and salts.

The base carrier of this invention can be any suitable liquid neutral vehicle such as a natural or synthetic material having lubricating properties. Thus, the base may be a hydrocarbon oil obtained from a paraffinic, naphthenic, Mid-Continent or Coastal stock and/or mixtures thereof. The viscosity of these oils may vary over a wide range such as from 45 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and alkylene oxides, organic esters, e. g., 2-ethylhexyl sebacate, dioctyl phthalate, trioctyl phosphate; polymeric tetrahydrofuran, polyalkyl silicone polymers, e. g., dimethyl silicone polymer and the like. If desired, the synthetic lubricants may be used as the sole base lubricant or admixed with fixed oils and derivatives thereof. The base oil should comprise about 90% or more of the total composition.

The following table illustrates specific compositions of this invention, each component of which may be used in amounts indicated above and hereinafter.

| Components | Composition | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Primary Additive: | | | | | | | | | | | | | | | | | | | | |
| Ester— | | | | | | | | | | | | | | | | | | | | |
| butyl trichloromethane-chlorophosphonate | x | | | | x | | | x | | x | x | | | x | x | | x | x | | |
| trichloromethanechloro-phosphonic acid | | x | | | | | | | | | | | x | | | | | x | x | |
| di-n-butylamine trichloro-methanechlorophosphonate | | | | x | | | | | | | | | | | | x | | | | |
| Na trichloromethanechloro-phosphonate | | | | | | x | | | x | | | | | | | | | | | |
| 2-ethylhexylamine penta-chlorocyclohexanechloro-phosphonate | | | | | | | x | | | | | | x | | | | | | | |
| tribromomethanebromo-phosphonic acid | | | | | | | | | | | | | | | | | | | | x |
| phenyl trichloromethane-chlorophosphate | | | x | | | | | | | | | | | | | | | | | |
| Secondary Additive: [1] | | | | | | | | | | | | | | | | | | | | |
| sulfurized sperm oil | | x | | | | | | | | | x | | x | | x | | | | | |
| chloro dibenzyl disulfide | | | | | | | | | | | x | | | | | | | | | |
| sulfurized-phosphorized-terpene | | | | | | | | | | x | | x | | | | | | | | |
| ethylene bis-tolyl sulfide | | | | | | | | | | | | | | x | x | x | | | | |
| alkylated phenol | | | | | | | | | | | | | | | | | x | x | | |
| Base: | | | | | | | | | | | | | | | | | | | | |
| mineral oil | x | x | x | | | x | x | x | | | x | | x | | x | | x | | | x |
| di(2-ethylhexyl)sebacate [2] | | | | x | x | | | | | x | | x | | x | | | | x | x | |
| polyethylene oxide polymer | | | | | | | | | x | | | | | | | x | | | x | |

[1] The secondary additives as listed above and those presented hereinafter can be used in amounts varying from 0.01% to 2% and higher. The primary additives are used in amounts indicated and the base constitutes the balance of the composition.
[2] Containing 15% of polymeric ester of acrylic acid and 1% phenyl-alpha-naphthylamine.

Compositions of this invention were tested in the Hypoid Gear Machine, in the Four-ball Extreme Pressure Lubricating Tester similar in principle to the Boerlage apparatus described in the magazine, Engineering, volume 136, July 13, 1933, and under L–19–645 engine test conditions as described in the 1946 CRC Handbook published by the Coordination Research Council.

TEST RESULTS

| Composition | 4-Ball Tester (1800 r. p. m.; 1 minute, steel on steel, ambient temperature), Initial Seizure Load (Kg.) | CRC L-19-645 Test | Hypoid Gear Machine (p. s. i.) |
|---|---|---|---|
| Mineral oil (SAE 90) | 42–48 | Failed | 8 |
| Composition 1 [1] | 100–112 | Passed | 60 |
| Composition 5 [1] | 112–126 | do | 80+ |
| Composition 19 [1] | 178–200 | | |

[1] Chloro-phosphorus additive present in amount of 0.82% Cl weight, which on the amount by weight of the additive used would be 1.58% by weight for compositions 1 and 5 and 1.25% by weight for composition 19.

From the data, it can be noted that compositions of this invention are outstanding for their extreme pressure and load carrying capacity. In addition, additives of this invention impart stability and other desired properties to base compositions in which they are incorporated.

Compositions of this invention can be modified by addition thereto of minor amounts (0.01–2%) of pour point depressants, viscosity index improvers, blooming agents, corrosion inhibitors, oiliness agents and the like. Among such materials can be included high molecular weight polymers, e. g., "Acryloids," wax-naphthalene condensation products, isobutylene polymers, alkyl styrene polymers, inorganic and organic nitrites (Na or Li NO₂ and diisopropylcyclohexyl ammonium nitrite); organic amines (phenyl alpha naphthylamine), alkyl phenols (2,4-ditert-butyl 6-methyl phenol); organic phosphites and phosphates such as trichloroethyl phosphate, tricresyl phosphate, dilorol phosphate, dicyclohexyl thiophosphate, methyl cyclohexyl thiophosphate, organic sulfides, e. g., wax disulfide, ethylene bis-tolyl sulfide; sulfurized sperm oil, P₂S₅ terpene reaction product, and the like.

In addition to being employed in lubricants, the additives of the present invention can be used in motor fuels, hydraulic fluids, torque converter fluids, gear oils, cutting oils, drawing oils, turbine oils, as well as in various types of natural and synthetic greases, asphalts, dry cleaning fluids, paints, insecticidal compositions, aqueous and nonaqueous emulsions, printing ink, cleaning compositions and the like.

We claim as our invention:

1. A composition of matter consisting essentially of a major amount of lubricating oil and a minor amount, sufficient to stabilize against oxidation deterioration and impart extreme pressure properties to said liquid vehicle, of a middle halo-phosphorus compound having the general formula

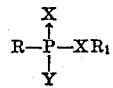

wherein X is a chalcogen element selected from the group consisting of oxygen and sulfur, Y is a middle halogen, R₁ is selected from the group consisting of hydrogen, alkyl, aryl, alkaryl, aralkyl, cyclic radicals and cationic radicals, and R is a hydrocarbyl radical containing at least one middle halogen atom.

2. A composition of claim 1, wherein R is a polyhaloalkyl radical, said halo atoms being a middle halogen and being not more than 4 carbon atoms removed from the phosphorus atom.

3. A composition of claim 1, wherein R is a polyhaloalkyl radical, said halo atoms being a middle halogen and being not more than 4 carbon atoms removed from the phosphorus atom, and wherein R₁ is hydrogen.

4. A composition of claim 1, wherein R is a polyhaloalkyl radical, said halo atoms being a middle halogen, and being not more than 4 carbon atoms removed from the phosphorus atom, and wherein R₁ is an alkyl radical.

5. A composition of claim 1 wherein R is a polyhaloalkyl radical, said halo atoms being a middle halogen and being not more than 4 carbon atoms removed from the phosphorus atoms, and wherein R₁ is a cationic radical.

6. A composition of matter consisting essentially of a major amount of a mineral lubricating oil and a minor amount, sufficient to stabilize against oxidation deterioration and impart extreme pressure properties to said oil, of a polychloroalkanechlorophosphonic acid.

7. A composition of matter consisting essentially of a major amount of a mineral lubricating oil and a minor amount, sufficient to stabilize against oxidation deterioration and impart extreme pressure properties to said oil, of an ester of a polychloroalkanechlorophosphonic acid.

8. A composition of matter consisting essentially of a major amount of a mineral lubricating oil and a minor amount, sufficient to stabilize against oxidation deterioration and impart extreme pressure properties to said oil, of a salt of a polychloroalkanechlorophosphonic acid.

9. A composition of matter consisting essentially of a major amount of a mineral lubricating oil and a minor amount, sufficient to stabilize against oxidation deterioration and impart extreme pressure properties to said oil, of trichloromethanechlorophosphonic acid.

10. A composition of matter consisting essentially of a major amount of a mineral lubricating oil and a minor amount sufficient to stabilize against oxidation deterioration and impart extreme pressure properties to said oil of butyl trichloromethanechlorophosphonate.

11. A composition of matter consisting essentially of a major amount of a mineral lubricating oil and a minor amount sufficient to stabilize against oxidation deterioration and impart extreme pressure properties to said oil of an amine salt of trichloromethanechlorophosphonic acid.

12. A composition of matter consisting essentially of a major amount of a mineral lubricating oil and a minor amount sufficient to stabilize against oxidation deterioration and impart extreme pressure properties to said oil, of di-n-butyl amine salt of trichloromethanechlorophosphonic acid.

13. A composition of matter consisting essentially of a major amount of a mineral lubricating oil and a minor amount sufficient to stabilize against oxidation deterioration and impart extreme pressure properties to said oil of di-2-ethylhexyl amine salt of trichloromethanechlorophosphonic acid.

14. A composition of matter consisting essentially of a major amount of a mineral lubricating oil and minor amounts sufficient to stabilize against oxidation deterioration and impart extreme pressure properties to said oil, of sodium salt of trichloromethanechlorophosphonic acid.

15. A composition of matter consisting essentially of a major amount of a mineral lubricating oil and minor amounts sufficient to stabilize against oxidation deterioration and impart extreme pressure properties to said oil, of calcium salt of trichloromethanechlorophosphonic acid.

16. A composition of matter consisting essentially of a major amount of a mineral lubricating oil and a minor amount sufficient to stabilize against oxidation deterioration and impart extreme pressure properties to said oil, of tribromomethanebromophosphonic acid.

17. A composition of matter consisting essentially of a major amount of a mineral lubricating oil and a minor amount sufficient to stabilize against oxidation deterioration and impart extreme pressure properties to said oil, of trichloromethanebromophosphonic acid.

References Cited in the file of this patent

UNITED STATES PATENTS

| | | |
|---|---|---|
| 2,674,616 | Morris | Apr. 6, 1954 |
| 2,683,691 | Thorpe et al. | July 13, 1954 |